United States Patent
Vadot et al.

(10) Patent No.: US 7,425,241 B2
(45) Date of Patent: Sep. 16, 2008

(54) ASSEMBLY COMPRISING A TRIM PART FOR A MOTOR VEHICLE AND ANOTHER PART SECURED TO THE TRIM PART BY MELTING MATERIAL, AND A METHOD OF ASSEMBLING THE PARTS

(75) Inventors: Jacques Vadot, Meximieux (FR); Francois Virelizier, Bourgoin Jallieu (FR); Marc Verwaerde, Panossas (FR)

(73) Assignee: Compagnie Plastic Omnium, Lyons (FR)

( * ) Notice: Subject to any disclaimer, the term of this patent is extended or adjusted under 35 U.S.C. 154(b) by 0 days.

(21) Appl. No.: 10/936,220

(22) Filed: Sep. 8, 2004

(65) Prior Publication Data

US 2005/0104389 A1     May 19, 2005

(30) Foreign Application Priority Data

Sep. 8, 2003   (FR) .................................. 03 10567

(51) Int. Cl.
    *B32B 37/00*   (2006.01)
(52) U.S. Cl. .................... 156/73.1; 156/580.2
(58) Field of Classification Search .............. 156/73.1, 156/290, 308.2, 308.4, 580.1, 580.2; 264/442, 264/443, 445
See application file for complete search history.

(56) References Cited

U.S. PATENT DOCUMENTS

| | | | | |
|---|---|---|---|---|
| 3,563,822 A | * | 2/1971 | Fesh | 156/73.1 |
| RE28,642 E | * | 12/1975 | Davis | 228/1.1 |
| 4,647,325 A | * | 3/1987 | Bach | 156/73.1 |
| 5,092,643 A | | 3/1992 | Okamoto | |
| 5,662,766 A | * | 9/1997 | Ishikawa et al. | 156/580.2 |

FOREIGN PATENT DOCUMENTS

JP    56 071591 A    6/1981
WO   WO 03/047844   6/2003

* cited by examiner

*Primary Examiner*—James Sells
(74) *Attorney, Agent, or Firm*—James R. Williams

(57) ABSTRACT

This assembly of a trim part of thermoplastic material for a motor vehicle with another part having a thin portion of thermoplastic material is such that the thin portion presents through orifices and the melting of the trim part together with the thin portion is localized solely at the outlines of the through orifices. In the assembly method, the melting of material is obtained by welding, by means of tangential vibrations of a bit in an ultrasound frequency range. The tangential vibrations are applied to the thin portion of the other part so as to form at least one through orifice in said part and so as to cause melting of said part together with the trim part at the outline of the orifice.

6 Claims, 1 Drawing Sheet

ASSEMBLY COMPRISING A TRIM PART FOR A MOTOR VEHICLE AND ANOTHER PART SECURED TO THE TRIM PART BY MELTING MATERIAL, AND A METHOD OF ASSEMBLING THE PARTS

The present invention relates to an assembly of a trim part of thermoplastic material for a motor vehicle and another part having a thin portion of thermoplastic material secured to the trim part by melting material, and the invention also relates to a method of assembling the two parts.

BACKGROUND OF THE INVENTION

In the state of the art, various methods are already known for assembling two parts made of thermoplastic material, in particular by heat-sealing tongues, by riveting, and by spot welding.

When one of the assembled parts is a trim part, those methods can lead to problems because of shrink marks appearing on the outside face of the trim part, particularly when said trim part is of small thickness.

Indeed, firstly, spot welding leads to a puddle of molten material in the thickness of the trim part, and when this puddle of molten material solidifies, a shrink mark appears in the outside face.

Secondly, riveting and heat-sealing tongues require the trim part to have ribs, and they too lead to shrink marks in the outside surface.

OBJECTS AND SUMMARY OF THE INVENTION

A particular object of the invention is to remedy that drawback by providing an assembly of a trim part made of thermoplastic material for a motor vehicle and another part having a thin portion of thermoplastic material secured to the trim part by melting material, in which the outside face of the trim part does not include any shrink marks.

To this end, the invention provides an assembly of a trim part of thermoplastic material for a motor vehicle and another part having a thin portion of thermoplastic material secured to the trim part by melting material, wherein the thin portion presents through orifice and wherein the melting of the trim part with said thin portion is localized solely at the outlines of the through orifices.

The term "thin portion" is used to designate a portion of thickness lying in the range 0.5 millimeters (mm) to 4.5 mm, and preferably in the range 1 mm to 3 mm.

Since the melting of the two parts is localized solely at the outlines, no puddle of molten material is formed during the assembly operation, which means that the melting is sufficiently discrete to ensure that no shrink marks form in the outside face of the trim part.

An assembly of the invention may also include one or more of the following characteristics:
- the trim part is a bodywork part;
- the trim part is a bumper skin;
- the other part is a support part for a functional member;
- the functional member is a sensor, in particular an ultrasound sensor; and
- the other part constitutes reinforcement, in particular reinforcement for a bumper overrider.

The invention also provides a method of assembling a trim part of thermoplastic material for a motor vehicle with another part having a thin portion of thermoplastic material, assembly being performed by melting material by welding by means of tangential vibrations of a bit in an ultrasound frequency range, wherein the tangential vibrations are applied to the thin portion of the other part so as to form at least one through orifice in said part and so as to melt said part together with the trim part at the outline of said orifice.

Optionally, in this assembly method, vibrations are generated at a distance from the thin portion in a direction that is normal to said thin portion, and then the vibrations generated in the normal direction are transformed into vibrations tangential to said thin portion, and the tangential vibrations are applied to a small zone of the trim part.

Thus, not only does the method of the invention make it possible to avoid shrink marks by performing ultrasound welding tangentially, but it also makes it possible to weld parts that are difficult of access because of their environment, since it requires access to the part for welding only in a direction that is perpendicular to the weld plane.

An assembly method of the invention may also include one or more of the following characteristics:
- the method uses a sonotrode having an excitation end, at least one vibration end, and a body connecting the excitation end to the vibrating end and shaped so as to transform periodic motion imparted to the excitation end in an excitation direction into periodic motion of the vibrating end in a vibration direction perpendicular to the excitation direction;
- the sonotrode used possesses two vibrating ends disposed in such a manner that the sonotrode is tuning-fork shaped; and
- the two vibrating ends of the sonotrode leave sufficient space between them to leave room to pass a portion projecting from the other part, e.g. a sensor support.

BRIEF DESCRIPTION OF THE DRAWING

The invention will be better understood on reading the following description given purely by way of example and made with reference to the accompanying drawing, in which.

MORE DETAILED DESCRIPTION

Figure 1:
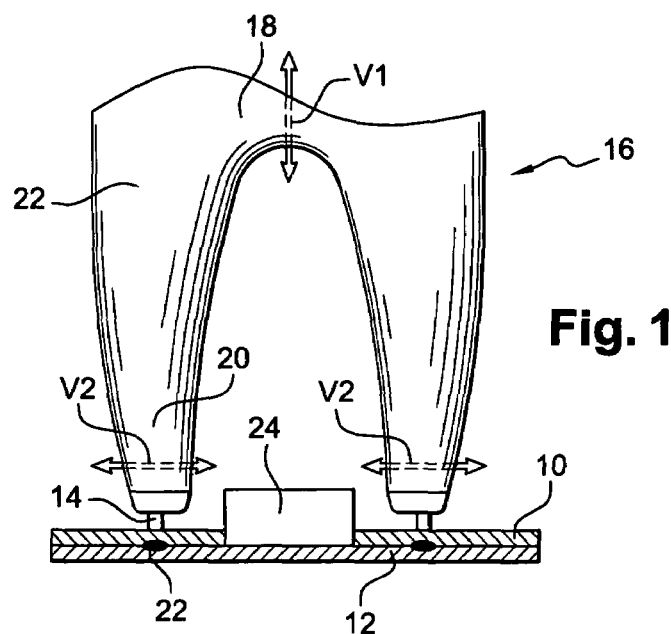
FIG. 1 is a diagram of two parts made of thermoplastic material being welded together by the method of the invention.

FIG. 1 shows a first part 10 that is thin and made of thermoplastic material being welded to a second part 12 of thermoplastic material by means of the method of the invention, welding being implemented by local application of vibrations in an ultrasound frequency range to the first part 10 by means of a bit 14.

The bit is secured to a sonotrode 16 having an excitation end 18, a vibrating end 20 carrying the bit 14, and a body 21 connecting the excitation end to the vibrating end, and shaped to transform periodic motion designated by reference V1 that is imparted to the excitation end 18 in an excitation direction that is substantially normal to the first part 10, into periodic motion V2 of the vibrating end 20 in a direction of vibration that is perpendicular to the excitation direction.

Thus, in the method of the invention:
- vibrations V1 are generated in the excitation end 18, and thus at a distance from the first part 10, and in a direction that is normal to said first part 10;

these normal vibrations V1 are transformed into vibrations V2 that are tangential to the first part 10; and these tangential vibrations V2 are then applied by means of the bit 14 to a small zone of the first part 10.

These tangential vibrations V2 form through orifices in the part 10, and lead to melting 22 of this part 10 together with the trim part 12 around the outlines of the orifices. This melting 22 does not lead to shrink marks in the outside surface of the second part 12. It is important to avoid shrink marks in this type of part 12 since it often constitutes a piece of bodywork, or more particular a bumper skin.

In general, the first part 10 is a support part for a functional member. In the example shown, the functional member is an ultrasound sensor 24.

In order to ensure that the sensor does not get in the way of welding, the sonotrode 16 that is used possesses two vibrating ends 20 that are disposed in such a manner that the sonotrode is shaped like a tuning fork.

These two vibrating ends 20 leave sufficient space between them to allow the sensor 24 to pass.

The sonotrode 16 can thus engage the first part 10 perpendicularly so as to perform tangential welding without being hindered by the sensor 24.

Figure 2:
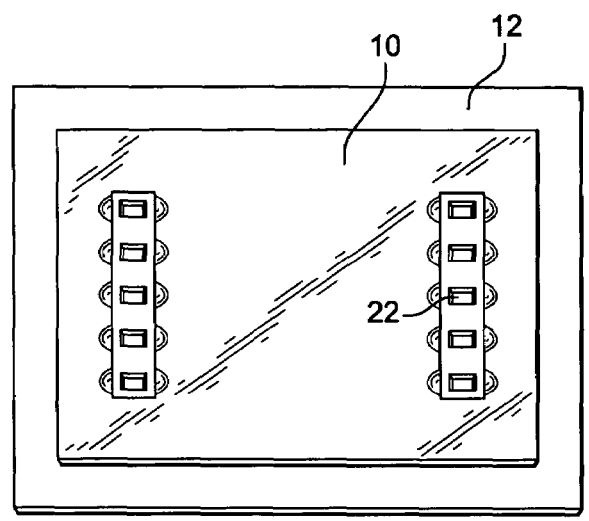
FIG. 2 shows the appearance of a weld between two thermoplastic material parts welded together by the method of the invention.

FIG. 2 shows an assembly constituted by a bodywork part 12 made of thermoplastic material for a motor vehicle and a thin part 10 made of thermoplastic material. More particularly, the assembly is constituted by a bumper skin 12 of thermoplastic material and by a sensor support part 10.

The sensor support part 10 is welded to said bumper skin by implementing the method of the invention.

FIG. 2 shows the shape taken by the weld when welding using the method of the invention.

Figure 3:
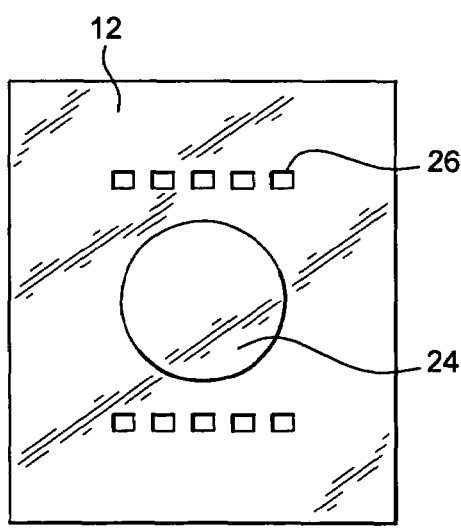
FIG. 3 is a diagrammatic view of the inside face of a trim part of an assembly of the invention.

FIG. 3 is a diagrammatic view of the inside face of the trim part 12. There can be seen therein the outlines 26 that correspond to the outlines of the through orifices where said trim part 12 has melted together with the part 10.

Naturally, the embodiment described above is not limiting in any way and could be modified in any desirable manner without thereby going beyond the ambit of the invention.

What is claimed is:

1. A method of assembling a trim part of thermoplastic material for a motor vehicle with another part having a thin portion of thermoplastic material, assembly being performed by melting material by welding by means of tangential vibrations of a bit in an ultrasound frequency range, wherein the tangential vibrations are applied to the thin portion of the other part so as to form at least one though orifice in said part and so as to melt said part together with the trim part solely at the outline of said orifice.

2. An assembly method according to claim 1, in which vibrations are generated at a distance from the thin portion in a direction that is normal to said thin portion, and then the vibrations generated in the normal direction are transformed into vibrations tangential to said thin portion, and the tangential vibrations are applied to a small zone of the trim part.

3. An assembly method according to claim 2, using a sonotrode having an excitation end, at least one vibration end, and a body connecting the excitation end to the vibrating end and shaped so as to transform periodic motion imparted to the excitation end in an excitation direction into periodic motion of the vibrating end in a vibration direction perpendicular to the excitation direction.

4. An assembly method according to claim 3, in which the sonotrode used possesses two vibrating ends disposed in such a manner that the sonotrode is tuning-fork shaped.

5. An assembly method according to claim 4, in which the two vibrating ends of the sonotrode leave sufficient space between them to leave room to pass a portion projecting from the other part.

6. An assembly method according to claim 5, in which the other part comprises a sensor support.

* * * * *